Aug. 17, 1965     W. C. TRETHEWEY     3,200,971
APPARATUS AND METHOD FOR CONTROLLING LIQUID LEVEL
Filed Aug. 1, 1961     3 Sheets-Sheet 1

INVENTOR.
WILLIAM C. TRETHEWEY
BY
ATTORNEYS

Aug. 17, 1965  W. C. TRETHEWEY  3,200,971
APPARATUS AND METHOD FOR CONTROLLING LIQUID LEVEL
Filed Aug. 1, 1961  3 Sheets-Sheet 2
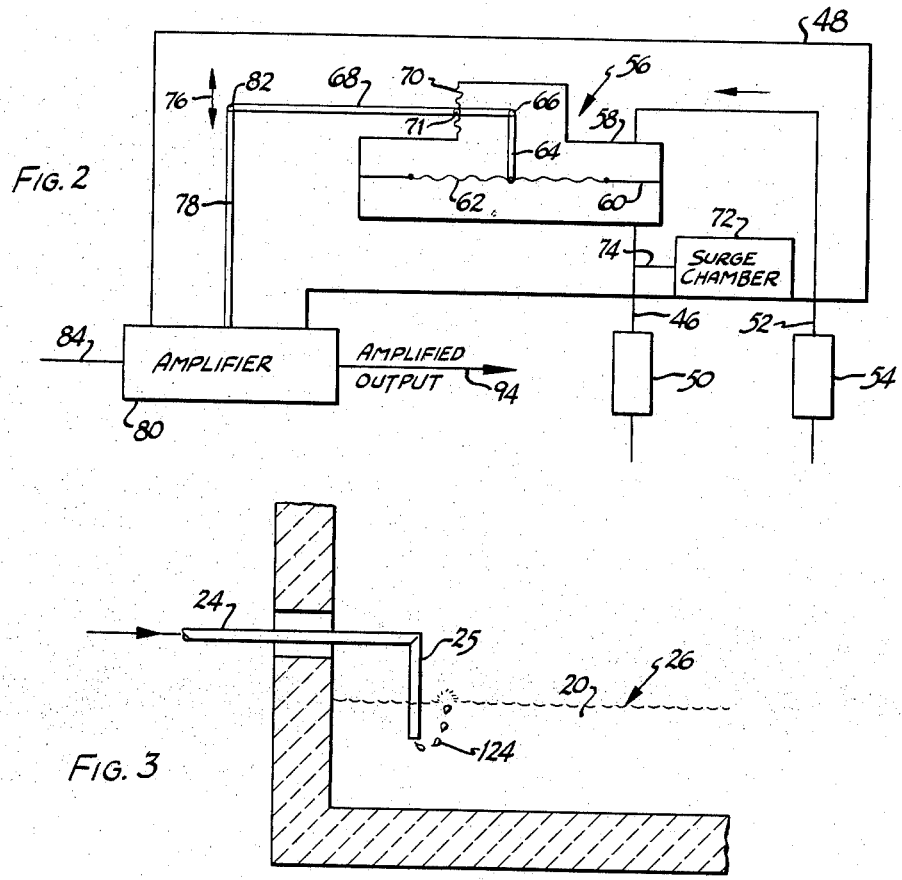
FIG. 2
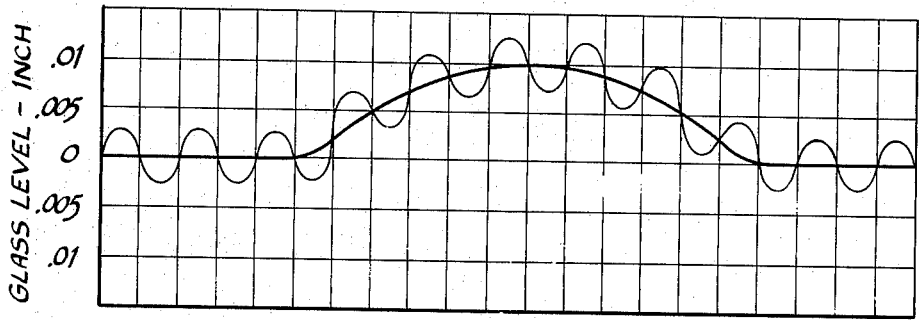
FIG. 3
FIG. 4
PULSES
INVENTOR.
WILLIAM C. TRETHEWEY
BY
ATTORNEYS

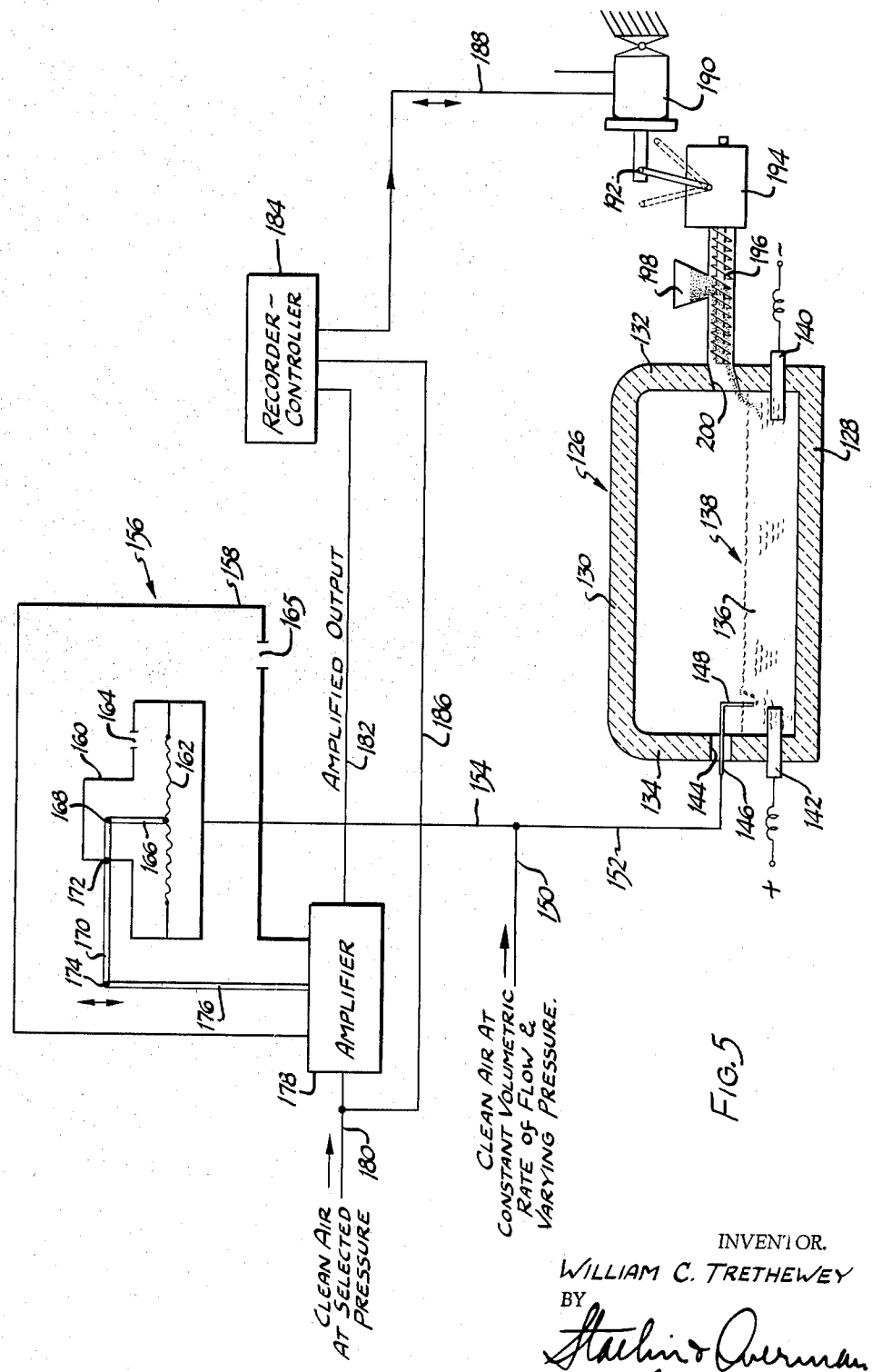

United States Patent Office 3,200,971
Patented Aug. 17, 1965

3,200,971
APPARATUS AND METHOD FOR CONTROLLING LIQUID LEVEL
William C. Trethewey, Newark, Ohio, assignor to Owens-Corning Fiberglas Corporation, a corporation of Delaware
Filed Aug. 1, 1961, Ser. No. 128,474
10 Claims. (Cl. 214—18.2)

This invention relates to an improved liquid level controller and more particularly to a molten glass level controller and to a method for controlling the level of molten glass in a glass melting furnace from which molten glass is constantly removed and to which glass forming materials are constantly added.

In the production of glass it is desirable to maintain a substantially constant head or level of molten glass in a melting furnace. One important reason for providing a substantially constant level is to reduce the up and down washing action of the glass surface with respect to the refractory. Since the washing action causes particles of the refractory to fall into the melt, with consequent contamination thereof, the substantial elimination of the washing action will result in substantial elimination of stone formation in the melt through the erosion and scaling of the refractory.

Another important reason for maintaining a substantially constant level of glass in the melting furnace is to provide a constant head of glass; this will provide a constant glass feed. When temperature, viscosity and head are retained substantially constant, glass flow from the furnace will be constant and this will greatly contribute to the uniformity of product.

Where firing rates are dependent upon level fluctuations: that is, where firing is reduced when the glass level falls and is increased when glass level increases due to the addition of new charge, thermal gradients are formed in the molten glass and these result in non-uniform feeding. To prevent these gradients, it is desirable to keep the glass level constant and thus retain firing rates constant.

However, in production where molten glass is constantly being removed from a furnace, it is necessary to add glass-forming materials to compensate for the glass removed. Under these conditions, the addition of glass-forming materials requires extremely careful control to maintain a substantially constant glass level.

It is accordingly an important object of the present invention to provide a novel liquid level controller of improved accuracy and sensitivity.

Another object is to provide a novel method for controlling liquid level.

A further object is to provide a liquid level controller adapted for use in glass melting furnaces wherein the controller compensates for variations in the pressure of the ambient firing atmosphere above the molten glass.

A further object of the present invention is to provide a glass level controller for controlling the level of molten glass in a glass melting furnace wherein a constant stream of small gas bubbles is issued beneath the level of the molten glass, the pressure necessary for issuance of the bubbles being truly indicative of the molten glass level.

Another object is to provide a method for controlling the level of a body of liquid from which liquid is constantly being withdrawn and to which replacement liquid materials or replacement liquid-forming materials are constantly being added, wherein gas is supplied under constant volumetric flow conditions at a fixed point beneath the surface of the body of liquid as discrete bubbles of a maximum dimension less than the point-to-surface dimensions and at pressures dependent upon the head of liquid above the fixed point, and wherein replacement materials are fed to the body in response to pressure variations in the head of liquid above the fixed point.

Other objects of this invention will appear in the following description and appended claims, reference being had to the accompanying drawings forming a part of this specification wherein like reference characters designate corresponding parts in the several views.

Briefly the apparatus of the present invention includes a first gas-conducting probe which is adapted to be submerged at its open end at a fixed point in a body of liquid such as molten glass. Gas is passed through the probe to issue upwardly from the submerged end of the probe through the melt as a plurality of small, individual successive bubbles of a maximum dimension less than the point-to-surface dimension. The gas is passed through the probe from a constant volumetric flow device at pressures varying in accordance with variations in the head of liquid above the submerged end of the probe. Means is provided for measuring or sensing the variations in pressure caused by fluctuations of the fluid level or head and these variations are converted into a control signal. The control signal is utilized to control a feed mechanism for replacing fluid being withdrawn from the body.

When the level controller of the present invention is utilized for controlling the level of glass in a gas-fired glass melting furnace where the atmosphere above the molten glass is subject to slight variations of pressure due to variations in firing, an additional probe is provided in combination with the first probe and this additional probe is placed in the atmosphere above the molten glass to sense the variations in pressure of the atmosphere. Inasmuch as the first probe, which is immersed in the molten glass, is effective not only to detect changes in glass level but also to detect changes in the atmospheric pressure above the glass through its reaction on the glass surface, the effect of the atmosphere must be offset or subtracted from the reading of the immersed probe to give a true reading of the glass head. Accordingly by the present invention the atmospheric pressure above the glass is sensed and balanced off against the total pressure sensed through the immersed probe. Thus a true glass head reading is provided. Fluctuations in this glass head alone are therefore converted into a control signal which is utilized to control a batch feeder for supplying glass-forming materials to the molten body of glass at a rate commensurate with the rate of withdrawal of molten glass therefrom.

Where the atmosphere above the molten glass is of constant value, i.e., not subject to variations in pressure, the apparatus of this invention utilizes only the submerged probe to measure fluctuations in the head of glass. These fluctuations are converted into a signal which is utilized to feed glass-forming materials to the molten body as molten glass is withdrawn.

In the drawings:

FIGURE 2 illustrates in schematic form a sensing element and transmitter in the form of a diaphragm-type pressure differential detector with associated resistor and surge chamber as contained in the transmitter of FIG. 1;

FIGURE 3 is an enlarged view illustrating the manner in which intermittent gas bubbling is provided;

FIGURE 4 is a graph illustrating the smooth record produced by the present invention as compared to an unmodulated flow-produced record; and FIGURE 5 is a schematic view of a second embodiment of the invention for use with a glass melting furnace having an atmosphere of constant pressure level.

Figure 1:
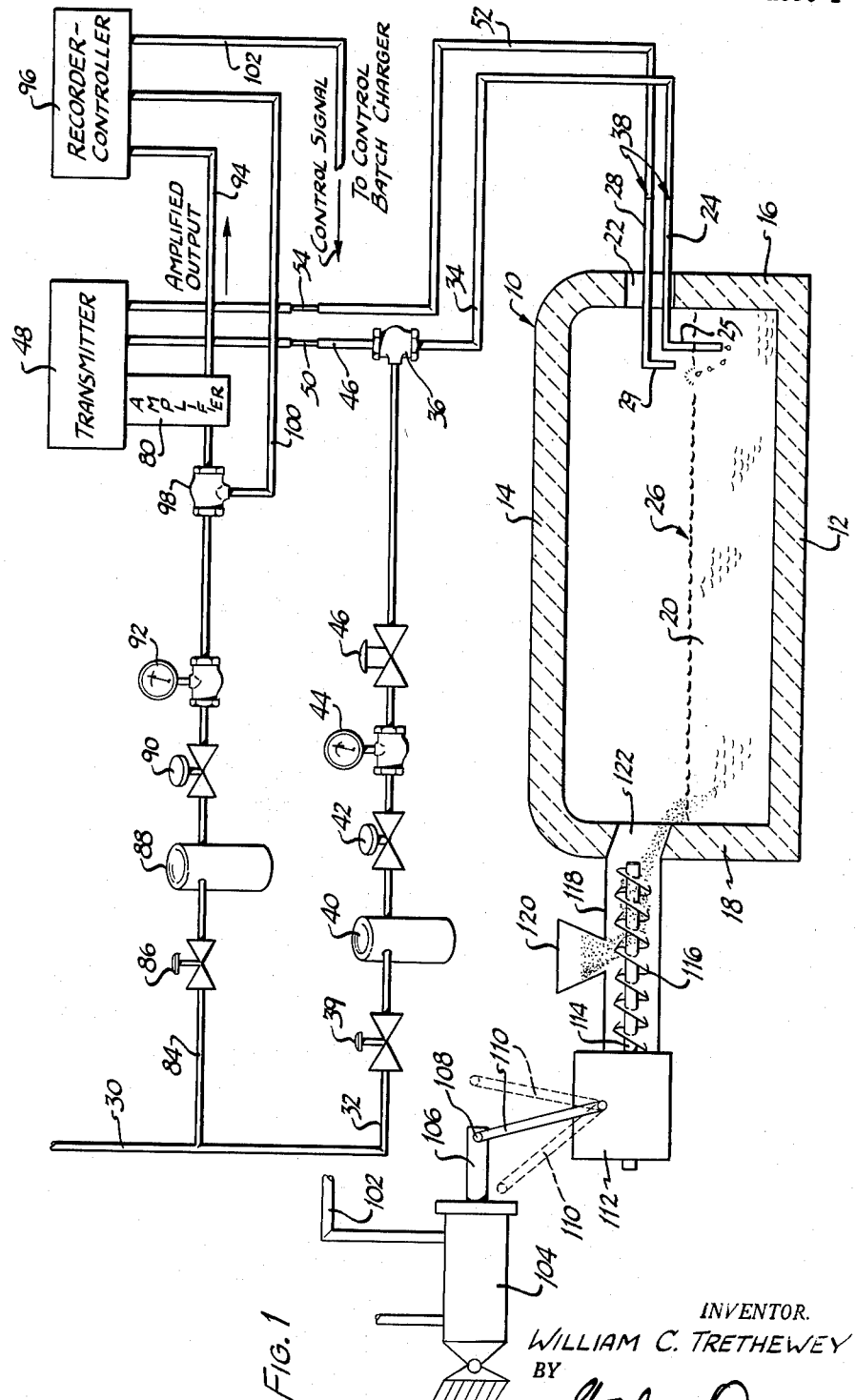
FIGURE 1 is a schematic view showing a glass melting tank and level detecting probes with associated control mechanism for introducing glass batch materials to the melting tank in response to changes in the level of glass in the tank.

Referring to FIGURE 1 of the drawings, a glass melting tank 10 having a refractory floor 12, a refractory top or arch 14 and walls 16 and 18 contains a pool of molten glass 20.

The furnace wall 16 is provided with an opening 22, positioned above the glass level. A probe 24, in the form of a high temperature-resistant metal tube, is extended through the opening 22 and projects vertically downwardly with the open end thereof immersed below the level 26 of the pool of molten glass 20. The probe 24 is fixed in position so that the terminal end 25 is at a fixed point in the molten glass.

This embodiment of the invention is adapted to use in a furnace which is fired by the combustion of a suitable fuel such as fuel gas. Dependent upon firing conditions, the atmosphere above the pool of molten glass 20 will be subject to slight pressure fluctuations as the firing rate is varied. Accordingly, the embodiment of the invention shown in FIGURE 1 incorporates a probe element for sensing variations in such firing atmosphere. Thus, an atmospheric sensing probe 28 is also inserted into the glass melting tank 10 through the opening 22. The atmospheric sensing probe 28 also takes the form of a high temperature resistant metal tube having a short downturned end 29 to provide protection against entry of extraneous particulate materials.

The probe 24 which has its open end immersed beneath the surface 26 of the pool of molten glass 20 is supplied with a constant volumetric flow of air or other suitable gas, the gas fluctuating in pressure dependent upon the head of glass or distance of the glass level 26 above the fixedly positioned lower end 25. For this purpose an air supply line 30, connected to a suitable source of supply (not shown), is joined with a feed line 32, which is joined to a branch line 34 by a connector 36. The branch line 34 is connected with the probe 24 at a point 38 outside of the furnace wall 16. The joinder is made at point 38 outside of the furnace so that the feed line 34 which is of lesser expensive and lower melting material such as copper will not be melted.

In the feed line 32 there is first provided a service valve 39, and secondly a filter 40 to assure removal of extraneous foreign matter such as dust particles and moisture from the supply air. Following the filter 40, there is provided a pressure regulator 42. The function of the pressure regulator is to stabilize the input to the flow regulator and to isolate it from pressure disturbances on the main supply line. Following the pressure regulator there is provided a gauge 44 to enable an operator to adjust the pressure regulator 42 to a desired level. Following the pressure gauge 44, there is a constant volumetric flow controller 46.

The function of the units 39–46 in the feed line 32 is to provide constant flow of gas at a pressure sufficient to meet all requirements. In the present invention, measurement of glass level is based on the fact that formation pressure of bubbles from the submerged tip of the immersed probe 24 in the pool of molten glass 20 is primarily dependent upon the pressure (head) exerted in opposition to the gas flow. When a change in the glass level 26 occurs, a corresponding change in pressure required to form bubbles is brought about. Thus the elements 39–46 provide a constant flow of gas under varying, but sufficient pressure to meet all requirements reflected by variations in the glass level 26.

At the connector 36 a branch line 46 leads to a transmitter designated by the reference numeral 48. The branch line 46 is provided therein with a modulating flow restrictor or filter 50 that cooperates with a surge chamber, to be described, in leveling out pressure fluctuations.

The atmospheric sensing probe 28 is also connected with the transmitter 48 by means of a line 52, having a modulating flow restrictor or filter 54 therein to level out pressure fluctuations.

Details of the transmitter 48 will now be described by reference to FIGURE 2 of the drawings wherein the cover or case of the transmitter 48 of FIGURE 1 is shown removed to reveal the components contained therein.

A principal component of the transmitter 48 is a diaphragm-type differential pressure detector 56 including a housing 58 having diaphragm supporting flanges 60 positioned therein between which a diaphragm 62 is supported. The diaphragm is sealed in gas-tight relationship to the flanges 60. The diaphragm is provided at its median portion with an upstanding connecting arm 64 pivotally connected at 66 to a horizontally disposed arm 68. The housing 58 is provided with a flexible cover element 70 through which the arm 68 extends in sealed relationship from the atmosphere, being supported upon a pivot 71.

The line 46 connected with the immersed probe 24 through the line 34 and connector 36 and having a flow restrictor 50 therein is connected into the housing 58 of the diaphragm-type differential pressure detector 56 on one side of the diaphragm 62. As shown in FIGURE 2, the connection is made on the lower side of the diaphragm.

A surge chamber 72 is connected into the line 46 by means of a line 74. This cooperates with the flow restrictor 50 to provide a "filtering" action for smoothing out the "bumps" or pressure decreases that occur as each bubble of gas is released from the immersed probe 24, thus preventing the transmitter from following each "bump," or pressure decrease.

The atmospheric probe 28 is connected to the other side of the diaphragm 62 by means of a line 52 with the flow restrictor 54 therein. According to the showing of FIGURE 2, the atmospheric sensing probe 28 is connected to the upper side of the diaphragm 62.

The horizontal arm 68 extending out of the housing 58 is movable in the direction of the arrow 76. A vertically disposed arm 78 from amplifier 80 is pivotally connected at 82 with the horizontal arm 68 of the pressure detector 56. The amplifier 80 is adapted to amplify a signal produced by the pressure detector 56 whose function will be discussed hereinafter.

Referring again to FIGURE 1 it will be seen that the supply line 30 connects with a feed line 84 which extends to the amplifier 80. In the feed line 84 there is provided a service valve 86, followed by a filter 88 and a pressure regulator 90. A guage 92 is also provided so that the pressure regulator 90 can be adjusted to a desired level. Thus clean air or gas at a desired pressure is supplied to the amplifier 80 whereby the signal from the transmitter 48 is amplified and carried by line 94 to a recorder controller 96.

By means of a T connector 98 in line 84, a branch line 100 is connected into the recorder controller 96 to provide a power supply. From the recorder controller 96 a control signal is transmitted by means of line 102 to a piston air operator 104. The connecting rod 106 of the air operator 104 is pivotally connected at 108 to the upper end of a control arm 110 forming part of a variable speed drive 112. The drive 112 may comprise a rheostat controlled electric motor or equivalent variable speed device. Extending from the variable speed drive 112 is a shaft 114 having a screw feed 116 formed thereon. The screw feed operates in an elongated tubular housing 118 into which powdered glass batch materials descend by gravity from a hopper 120. The elongated tubular housing 118 is connected in aligned relation to an opening 122 in the wall 18 of the furnace 10. Rotation of the screw feed 116 causes the powdered glass batch materials from the hopper 120 to be fed to the molten glass 20 at rates dependent upon the setting of the control arm 110.

*Operation of the first embodiment*

From the foregoing description it will be apparent that air or other suitable gas is introduced at a constant volumetric flow rate at a fixed point in a pool of molten glass 20 contained within the furnace 10. As shown in FIGURE 3 of the drawings, intermittent individual gas bubbles 124 are caused to be formed which rise in succession to the surface 26 of the body of glass 20; these bubbles have a maximum dimension less than the dimension between the fixed point at which they are released and the surface of the glass. Thus the open end of the immersed probe is never exposed to the atmosphere to provide large pressure drops; accordingly the glass head is recorded as a substantially smooth curve. In a particular embodiment of the present invention, the downwardly extending end 25 of the immersed probe 24 comprised a high temperature-resistant tube of ¼ inch outside diameter and having a wall thickness of 0.02 inch. With the lower end of the tube inserted from about 1 to about 2 inches below the surface 26 of the molten glass bath 20, air was delivered at a rate forming approximately 20 to 30 discrete bubbles per minute of a diameter less than the distance from the end of the probe to the surface of the glass so that the bubbles did not bridge the distance from the probe tip to the glass surface. Bubbles of this diameter are formed as the result of the relationship of molten glass viscosity, the small size of the probe and the low pressure at which the gas is supplied to the probe. As the glass level changes, a corresponding change in pressure required to form bubbles is effected. This pressure change is reflected through the line 46 to the lower side of the diaphragm 62 in the differential pressure detector 56 of the transmitter 48. In the furnace 10, wherein the atmosphere above the glass is heated by the combustion of a gas therein, the atmosphere is subject to slight pressure variations dependent upon such firing fluctuations. These pressures are reflected against the surface 26 of the glass and are accordingly picked up by the transmitter measuring the pressure fluctuations in the immersed probe 24.

It is the purpose of the atmosphere sensing probe 28 to cancel out the effects of the atmosphere on the measurements provided by the probe 24 and thus cause measurement of glass level in the system to be based solely upon the head of glass exerted in opposition to the gas flow in the probe 24. As pointed out hereinbefore, the atmosphere sensing probe 29 is open to the atmosphere within the furnace 10. This is connected through line 52 and flow restrictor 54 to the upper side of the diaphragm 62 of the pressure detector 56. This configuration and connection is effective to apply an opposing force to the upper surface of the diaphragm 62 equal to the force of the atmosphere imposed upon the glass level 26 and the consequent pressure imposed thereby upon the lower side of the diaphragm 62. Thus the pressure against the upper side of the diaphragm cancels out the atmospheric pressure imposed upon the head of glass and thus causes a signal to be generated within the pressure detector 56 which is based only upon the pressure exerted by the head of glass in opposition to the gas flow in immersed probe 24.

The signal generated by the transmitter 48, as shown in FIGURE 2, is fed into amplifier 80 and is there directed as amplified output through line 94 to recorder controller 96. Recorder controller 96 provides a control signal for feeding glass batch materials to the bath of glass 20, the rate of feed being accurately correlated to changes in the level thereof.

The apparatus of the present invention provides very sensitive control of glass level. In actual operation of a 100 ton tank, control to .01 inch is provided; thus a sensitivity of at least 10 times this or .001 inch is provided by the present invention.

An important feature of the present invention is explainable by reference to FIGURE 4 which illustrates the manner in which the filter system comprising flow restrictor 50 and surge chamber 72, connected with immersed probe 24, prevents the transmitter 48 from following each "bump" or pressure decrease that occurs as a bubble is released from the probe into the pool of molten glass 20. Thus a smooth record as indicated by the modulated flow line of FIGURE 4 is provided in contrast to the unmodulated flow line of sine wave configuration that would be provided were the filter system omitted.

It will thus be seen that a glass level controller of improved accuracy and simplicity is provided for use in a gas fired glass melting tank or furnace wherein the firing atmosphere is subject to pressure variations.

*The second embodiment*

The second embodiment of the invention is adapted to use in a furnace where the atmosphere above the glass is of unchanging pressure. This would include a furnace built of refractories and having spaced electrical resistance heating elements immersed in the body of glass contained therein with the glass itself forming a part of the electrical heating circuit. This would also include melting chambers or bushings as used in the production of glass fibers wherein the bushing is made of a high temperature resistant metal alloy and electricity is passed therethrough to provide resistance heating and melting of glass contained within the bushing.

Accordingly since it is not necessary to compensate for changes in the atmosphere above the glass, the second embodiment of the present invention utilizes only a single immersed probe to determine fluctuations in the glass level.

Description of the second embodiment of the present invention will now be made by reference to FIGURE 5 of the drawings. Inasmuch as clean gas at constant volumetric rate of flow and varying pressure is supplied to the probe in the same manner as described for the embodiment of FIGURE 1 and since clean gas at a selected pressure is provided for the amplifier and recorder controller in the same manner as described in FIGURE 1, the supply elements have been omitted to avoid repetition at this point. As shown in FIGURE 5 a glass melting furnace 126 includes a floor 128, roof or arch 130 and end walls 132 and 134 all made of suitable refractory. The furnace contains a body of molten glass 136 which has a surface or level 138. The body of molten glass 136 is heated by electrical resistance and for such purpose electrodes 140 and 142 are inserted through the walls 132 and 134; these are connected with a suitable source of electric current. When current is applied to the electrodes, the electrical energy flows between the electrodes through the body of glass 136 and is effective by the resistance of the glass to provide sufficient heat to render it molten.

The furnace wall 134 is provided with an opening 144 through which a high temperature resistant metal probe 146 having a downturned end 148 is inserted so that the downturned end has the terminus thereof immersed below the surface 138 of the body of molten glass 136. The probe 146 is positioned so that its terminal end is submerged in the body of molten glass 136 and positioned at a fixed point. The probe, as in the FIGURE 1 embodiment, suitably takes the form of a tube of high temperature resistant metal such as platinum alloy.

Clean air or other suitable gas is supplied at a constant volumetric rate of flow and suitable pressure to the probe 146–148 through a supply line 150 having a connecting branch 152. A second branch 154 leads to a detector-transmitter 156 contained within a protective housing 158. The detector-transmitter is similar to that employed in the FIGURE 1 embodiment and includes a casing 160 having a sealed, pressure sensitive diaphragm 162 contained therein. The branch line 154 is connected into the bottom of the casing 160 so that the pressure developed in the probe 146–148 is transmitted to the bottom side of the diaphragm 162. The cavity above the diaphragm 162 is vented to the atmosphere through apertures 164 and 165. The diaphrgam is fitted centrally with an upstanding arm 166 pivotally connected at 168 with a generally horizontally disposed arm 170, the arm 170 extending outwardly through the casing 160 upon a pivotal connection 172. By means of a pivotal connection 174 the arm 170 is connected to a vertically disposed arm 176 extending into an amplifier 178. The amplifier 178 is fed with clean gas at selected pressure from a supply line 180 to supply an amplified output through the line 182 to a recorder-controller 184. A line 186, connected to the supply line 180 is connected with the recorder-controller 184 to supply a power gas thereto. A control signal developed by the recorder-controller 184 is passed by line 188 to a piston air operator 190 which actuates a lever arm 192 of a variable speed drive 194 to control a screw feed 196 and move glass batch materials into the molten glass body 136 from the hopper 198 through an opening 200 in the furnace wall 132.

*Operation of the single probe embodiment*

Clean gas at constant volumetric flow and variable pressure is supplied to a single probe 146–148 having its terminal end immersed in glass bath 136 of the furnace 126 at a fixed point. Fluctuation in the level 138 of the glass bath will cause corresponding fluctuation in the pressure of the gas supplied to the probe 146–148. Inasmuch as the atmosphere above the molten body of glass 136 is constant and without pressure fluctuation, there will be no effect by the atmosphere upon the head of glass. Therefore a probe sensing the atmosphere above the glass body is not utilized as in the FIGURE 1 embodiment since the pressure variations in the probe 146–148 are due solely to the head of glass above the terminal tip of the probe. Accordingly the signal generated by the detector transmitter 156 is solely developed by changes in pressure effected by the head of glass on the probe 146–148, this signal being transmitted to an amplifier and then directed to a recorder-controller for regulating a batch charger in the same manner as the FIGURE 1 embodiment.

*Scope of the invention*

Although specific reference has been made to a probe comprised of a high temperature resistant tube of ¼ inch outside diameter and having a wall thickness of 0.02 inch, this is not to be considered as limiting upon the present disclosure. Thus, for example, a probe in the form of a tube of ⅛ inch outside diameter and having a 0.02 inch wall thickness has been successfully used in accordance with this invention. Also, a ⅜ inch outside diameter tube has been successfully employed. Therefore, probes within the range of ⅛ inch to ⅜ inch outside diameter illustrate specific examples of the application of the invention and therefore the probe size is not to be considered as the limiting factor on the scope of the disclosure.

As discussed hereinbefore, a gas flow rate sufficient to form bubbles in the range of approximately 20–30 bubbles per minute provides a preferred operating range in which a stable region of measurement exists where the formation of bubbles is relatively immune to viscosity changes and highly accurate measurements can be made. It has been found that below about 20 pulses a minute, the glass level measuring is of lesser stability and above 30 bubbles or pulses per minute, viscosity becomes an important factor and a positive error in level measurement may be encountered. Thus, a preferred range of approximately 20–30 pulses per minute will be utilized in the application of the present invention, with pulse rates slightly above and below this range to be included within the scope of the invention.

Probe immersion depths in the range from about 1 inch to about 2 inches have been successfully utilized in the present invention and demonstrate the versatility of the method and apparatus for measuring shallow glass conditions as in the forehearth of a furnace. However, measurements in deeper zones of furnaces can be made with a high degree of accuracy, utilizing a greater immersion depth if desired.

While the foregoing description has related to air-actuated instrumentation for controlling the batch feed, it is to be considered within the scope of the invention to utilize all electrical instrumentation from the transmitter on around the control loop to control the rate of feed of the glass forming materials to the furnace. This alternate construction has been successfully carried out in accordance with the invention.

*Advantages of the present invention*

By the present invention there is provided an apparatus and method for controlling the level of fluids and more particularly molten glass in a glass melting furnace or tank. The apparatus is of simplified construction, requiring no moving parts within the furnace. Further, the apparatus of the present invention is adapted to operate under extremely low heads of glass. That is, the probe may be inserted to a depth of about 1 inch for measuring shallow glass conditions as in the forehearth of a furnace. In deeper zones of course a greater depth can be used if desired. However, in view of the fact that the unit is operable at a depth of from about 1 to about 2 inches, the versatility of the device of the present invention is demonstrated. Further, the apparatus and method of the present invention provide an extremely high degree of accuracy of control of the head of molten glass in a glass melting furnace. Thus the present invention is effective to control the level of glass in a melting furnace to plus or minus .01 inch. Further, the method and apparatus of the present invention are adapted to glass melting conditions where either fluctuating or stable atmospheres exist above the glass. It is another advantage of the present invention that pressure fluctuations caused by the release of bubbles from the probe are filtered out of the control signal to provide a smooth record.

I claim:

1. In a method of controlling molten glass level in a glass melting furnace having a combustion heated glass melting chamber wherein the atmospheric pressure above the molten glass in said chamber fluctuates due to variations in the combustion, the steps of discharging a gaseous stream at a low velocity and constant volumetric flow at a fixed point beneath the surface of the glass melt, the hydrostatic head of the glass melt and atmospheric pressure above the melt determining the pressure of the gaseous stream required to maintain constant gaseous flow as intermittent slow rate bubbling, sensing the pressure variations in the gaseous stream caused by changes in said hydrostatic head of glass and in said combustion atmosphere to provide a signal, sensing said combustion atmosphere pressure and subtracting the pressure of said atmosphere from said signal to provide an altered signal, and utilizing said altered signal to control the rate of batch charging to the glass melting process.

2. In a method of controlling glass level in a glass melting furnace having a combustion heated glass melting chamber wherein the atmospheric pressure above the molten glass in said chamber fluctuates due to variations in the combustion, the steps of discharging a gaseous stream at a low velocity and constant volumetric flow at a fixed point beneath the surface of the glass melt, the hydrostatic head of the melt and atmospheric pressure above the melt determining the pressure of the gaseous stream required to maintain constant flow as intermittent slow rate bubbling, sensing the pressure variations in said gaseous stream caused by changes in said hydrostatic head of glass and in said combustion atmosphere to provide a signal, filtering said signal to provide a smooth curve, sensing said combustion atmospheric pressure and subtracting the pressure of said atmosphere from said filtered signal, and utilizing said altered signal to control the rate of batch charging to the glass melting furnace.

3. In a method of controlling molten glass level in a glass melting furnace having a combustion heated glass melting chamber wherein the ambient atmospheric pressure above the molten glass in said chamber fluctuates due to variations in the combustion, the steps of discharging a gaseous stream at a low pressure and constant volumetric flow at a fixed point beneath the surface of the molten glass, the hydrostatic head of the molten glass and atmospheric pressure determining the pressure of the gaseous stream required to maintain constant gaseous flow as intermittent slow rate bubbling, issuing the gaseous stream at said fixed point as a series of individual bubbles moving in sequence from the point of generation upwardly to the surface of the molten glass, each bubble having a maximum dimension less than the point-to-surface dimension, sensing the pressure variations in the gas stream caused by changes in said hydrostatic head to provide a signal, sensing said ambient atmosphere pressure and subtracting the pressure of said atmosphere from said signal to provide an altered signal, and feeding glass-forming materials to said furnace in response to said altered signal.

4. In a liquid level measuring apparatus, a first pneumatic probe adapted for the passage of gas therethrough, means for positioning said first probe to discharge gas at a fixed point in a body of liquid, means for supplying gas to said probe at a constant volumetric flow whereby pressures are dependent upon the head of liquid above the probe to provide intermittent slow rate bubbling, second probe means open to the atmosphere above the body of liquid and means for measuring the pressure differential between said first and second probes to provide a signal related solely to hydrostatic head imposed on the first probe.

5. In a method of controlling molten glass level in a glass melting furnace having a combustion heated glass melting chamber wherein the atmospheric pressure above the molten glass in said chamber fluctuates due to variations in the combustion, the steps of discharging a gaseous stream at a low velocity and constant volumetric flow at a fixed point beneath the surface of the glass melt, issuing the gaseous stream at said fixed point at a rate to provide between about 20 and about 30 bubbles per minute of a size less than the fixed point to surface distance, the hydrostatic head of the melt and atmospheric pressure above the melt determining the pressure of the gaseous stream required to maintain constant gaseous flow as intermittent slow rate bubbling, sensing the pressure variations in the gaseous stream caused by changes in said hydrostatic head of glass and in said combustion atmosphere to provide a signal, sensing said combustion atmospheric pressure and subtracting the pressure of said atmosphere from said signal to provide an altered signal, and utilizing said altered signal to control the rate of charging to the glass melting process.

6. In a method of determining the level of a body of liquid that is subjected to a fluctuating ambient atmosphere, the steps of
discharging gas bubbles at a constant flow rate into the body at a point fixed in space and beneath the surface of the body, to produce discharge pressures reflecting the head of liquid above the fixed point plus the fluctuating ambient atmosphere,
retaining the bubbles of a diameter less than the distance between the point and the surface of the body,
and subtracting the pressure of the fluctuating ambient atmosphere from the discharge pressure to produce a signal corresponding to the true hydrostatic head of liquid above the fixed point.

7. In apparatus for determining level of a body of liquid subject to a fluctuating ambient atmosphere,
a first pneumatic probe having a gas issuing tip,
means supporting said probe to position said tip beneath the surface of the liquid and at a point fixed in space,
means for supplying gas to said probe at constant volumetric flow,
detector means having two sides with one side connected to said first probe to sense the pressure therein,
and means balancing the other side of said detector to the ambient atmosphere immediately above the surface of the liquid.

8. In a level control mechanism for a body of liquid, from which liquid is constantly removed, and to which replenishment is made, the body of liquid having a surface that is subjected to an ambient atmosphere of fluctuating pressure,
a first probe having a tip submerged in the liquid at a fixed point in space,
means for supplying a sensing gas to said tip at a constant volumetric rate of flow whereby the pressure is variable in accordance with the distance of said surface of liquid above said tip to provide small individual bubbles traveling in sequence between said tip and said surface,
a second probe open to said fluctuating ambient atmospheric pressure immediately above said surface of said liquid,
means for measuring the difference between the gas pressures in said first and second probes to generate a signal related solely to the distance of said level of liquid above said first probe tip,
and means responsive to said signal for controlling the condition of replenishment to said body to maintain said surface substantially constant.

9. In a level sensing mechanism for a glass melting furnace having a melting chamber in which materials are melted to form a body of molten glass and a forehearth from which molten glass is released, and wherein a fluctuating combustion atmosphere in the melting chamber contributes to fluctuations of the liquid level in the forehearth,
a first probe having a tip submerged in the liquid within the forehearth at a fixed point in space,
means for supplying a gas to said tip at a constant volumetric rate of flow and at a pressure variable in accordance with the distance of said tip beneath the surface of the liquid, to provide small individual bubbles traveling in sequence between said tip and the surface of the liquid,
a second probe open to said fluctuating combustion atmosphere,
and means for measuring the difference between the gas pressures in said probes to provide a signal corresponding to variations of level in the body of molten glass.

10. In a method of sensing the level of a body of liquid that is subjected to an artificial atmosphere that fluctuates in pressure level,
the steps of
discharging a gaseous stream at a low velocity and constant volumetric flow at a fixed point beneath the surface of the liquid to provide small individual bubbles traveling in sequence between said tip and the surface of the liquid, the hydrostatic head of the liquid and the fluctuating atmospheric pressure above the liquid determining the pressure of the gaseous stream, sensing the pressure variations in the gaseous stream caused by changes in said hydrostatic head and in said atmosphere to provide a signal, sensing the pressure of said atmosphere, and subtracting the pressure of said atmosphere from said signal to provide a signal reflecting only the hydrostatic head above said fixed point to provide a true measure of the level of the body of liquid.

References Cited by the Examiner

UNITED STATES PATENTS

| | | | |
|---|---|---|---|
| 2,613,535 | 10/52 | Born | 73—302 |
| 2,891,686 | 6/57 | Roberson et al. | 214—18.2 |
| 3,058,672 | 10/62 | Zabel | 137—403 X |

HUGO O. SCHULZ, *Primary Examiner.*

DONALL H. SYLVESTER, *Examiner.*